United States Patent
Tortosa et al.

(10) Patent No.: US 11,079,927 B2
(45) Date of Patent: *Aug. 3, 2021

(54) AUTOMATED MODIFICATION OF GRAPHICAL USER INTERFACES

(71) Applicant: INTERNATIONAL BUSINESS MACHINES CORPORATION, Armonk, NY (US)

(72) Inventors: Andrea Tortosa, Rome (IT); Francesco Maria Carteri, Rome (IT); Massimo Marra, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/581,854

(22) Filed: Sep. 25, 2019

(65) Prior Publication Data

US 2020/0019293 A1 Jan. 16, 2020

Related U.S. Application Data

(63) Continuation of application No. 14/918,633, filed on Oct. 21, 2015, now Pat. No. 10,474,347.

(51) Int. Cl.
*G06F 3/0488* (2013.01)
*G06F 9/451* (2018.01)

(52) U.S. Cl.
CPC ............ *G06F 3/0488* (2013.01); *G06F 9/451* (2018.02)

(58) Field of Classification Search
CPC .... G06F 3/0416; G06F 3/0481; G06F 3/0488; G06F 9/451
See application file for complete search history.

(56) References Cited

U.S. PATENT DOCUMENTS

| 8,786,664 B2 | 7/2014 | Hornyak |
| 9,244,604 B1 | 1/2016 | Lewbel |
| 2009/0150814 A1 | 6/2009 | Eyer et al. |

(Continued)

FOREIGN PATENT DOCUMENTS

WO 2012127101 A1 9/2012

OTHER PUBLICATIONS

Mell et al., "The NIST Definition of Cloud Computing," National Institute of Standards and Technology, U.S. Department of Commerce, Special Publication 800-145, Sep. 2011, pp. 1-7.

(Continued)

*Primary Examiner* — Andrew T Chiusano
(74) *Attorney, Agent, or Firm* — Dmitry Paskalov

(57) ABSTRACT

Information that describes one or more touch events performed on a touchscreen display to interact with a graphical user interface (GUI) of a software application is received. A touch event density map based on a frequency of touch events on the touchscreen display as a function of touch event position on the touchscreen display is generated. One or more portions of the touchscreen display that received the highest density of touch events are identified. At least one of: dimension of the one or more graphical elements of the GUI associated with the one or more identified portions of the touchscreen display, a dimension of a touchscreen display area that corresponds to the one or more graphical elements, and a position relative to the one or more graphical elements of the touchscreen display area are modified.

20 Claims, 6 Drawing Sheets

(56) References Cited

U.S. PATENT DOCUMENTS

| | | |
|---|---|---|
| 2012/0036468 A1 | 2/2012 | Colley |
| 2012/0169613 A1 | 7/2012 | Armstrong |
| 2013/0019191 A1 | 1/2013 | Arnold |
| 2013/0044063 A1* | 2/2013 | Kim .................. G06F 3/0482 345/173 |
| 2013/0191779 A1 | 7/2013 | Radakovitz |
| 2013/0219518 A1 | 8/2013 | Sambamurthy |
| 2014/0068498 A1 | 3/2014 | Olsen |
| 2014/0089824 A1 | 3/2014 | George et al. |
| 2014/0123060 A1 | 5/2014 | Kuscher |
| 2014/0317171 A1 | 10/2014 | Fox |
| 2014/0327629 A1 | 11/2014 | Jobs |
| 2015/0067531 A1 | 3/2015 | Adimatyam et al. |
| 2015/0128049 A1 | 5/2015 | Block |
| 2015/0135109 A1 | 5/2015 | Zambetti |
| 2016/0162276 A1 | 6/2016 | Peng |
| 2017/0090749 A1 | 3/2017 | Marsden |
| 2017/0115794 A1 | 4/2017 | Carteri et al. |

OTHER PUBLICATIONS

Oracle, "Lightweight User Interface Toolkit: Advanced User Interfaces for Mass-Market Phones", JAVA™, Oracle Data Sheet, pp. 1-3, Copyright© 2010, Oracle and/or its affiliates.

Reynaga et al., "Exploring the Usability of Captchas on Smartphones: Comparisons and Recommendations", USEC '15, Feb. 8, 2015, San Diego, CA, USA, pp. 1-10, Copyright 2015 Internet Society, ISBN 1-891562-40-1, <hllp://dx.doi.org/10.14 722/usec.2015.23006>.

IBM: List of IBM Patents or Patent Applications Treated as Related (Appendix P), Nov. 7, 2019, pp. 1-2.

\* cited by examiner

AUTOMATED MODIFICATION OF GRAPHICAL USER INTERFACES

BACKGROUND OF THE INVENTION

The present invention relates generally to the field of touchscreen computer systems, and more particularly, modifying graphical user interfaces of touchscreen computer systems.

Touchscreen computer systems often implement a graphical user interface (GUI) enabling users of touchscreen computer systems to interact with one or more applications executed on the touch-display computer systems. For example, GUIs may include virtual keyboards which emulate physical computer keyboards. Virtual keyboards enable users of touch-display computer systems to input alphanumeric data using a text entry interface. Users that use touch-display computer systems may have varying physical capabilities, physical limitations, and/or personal preferences when interacting with one or more applications executed on a touch-display computer system.

SUMMARY

An automated modification of graphical user interfaces (GUI) is provided. Information that describes one or more touch events performed on a touchscreen display to interact with a graphical user interface (GUI) of a software application is received. A touch event density map based on a frequency of touch events on the touchscreen display as a function of touch event position on the touchscreen display is generated. One or more portions of the touchscreen display that received a highest density of touch events are identified. One or more graphical elements of the GUI associated with the one or more identified portions of the touchscreen display are identified. Responsive to determining that the one or more graphical elements of the GUI associated with the one or more identified portions of the touchscreen display do not align with a threshold alignment value, at least one of: a dimension of the one or more graphical elements of the GUI associated with the one or more identified portions of the touchscreen display, a dimension of a touchscreen display area that corresponds to the one or more graphical elements, and a position relative to the one or more graphical elements of the touchscreen display area are modified.

DETAILED DESCRIPTION

Embodiments of the present invention provide systems, methods, and computer program products for automatically modifying graphical user interfaces implemented by touch-display computer systems. Graphical user interfaces, for example, virtual keyboards, may be automatically modify for each user interacting with an application executed on touch-display computer systems, based on user input and analyzed touchscreen touch events.

Figure 1:
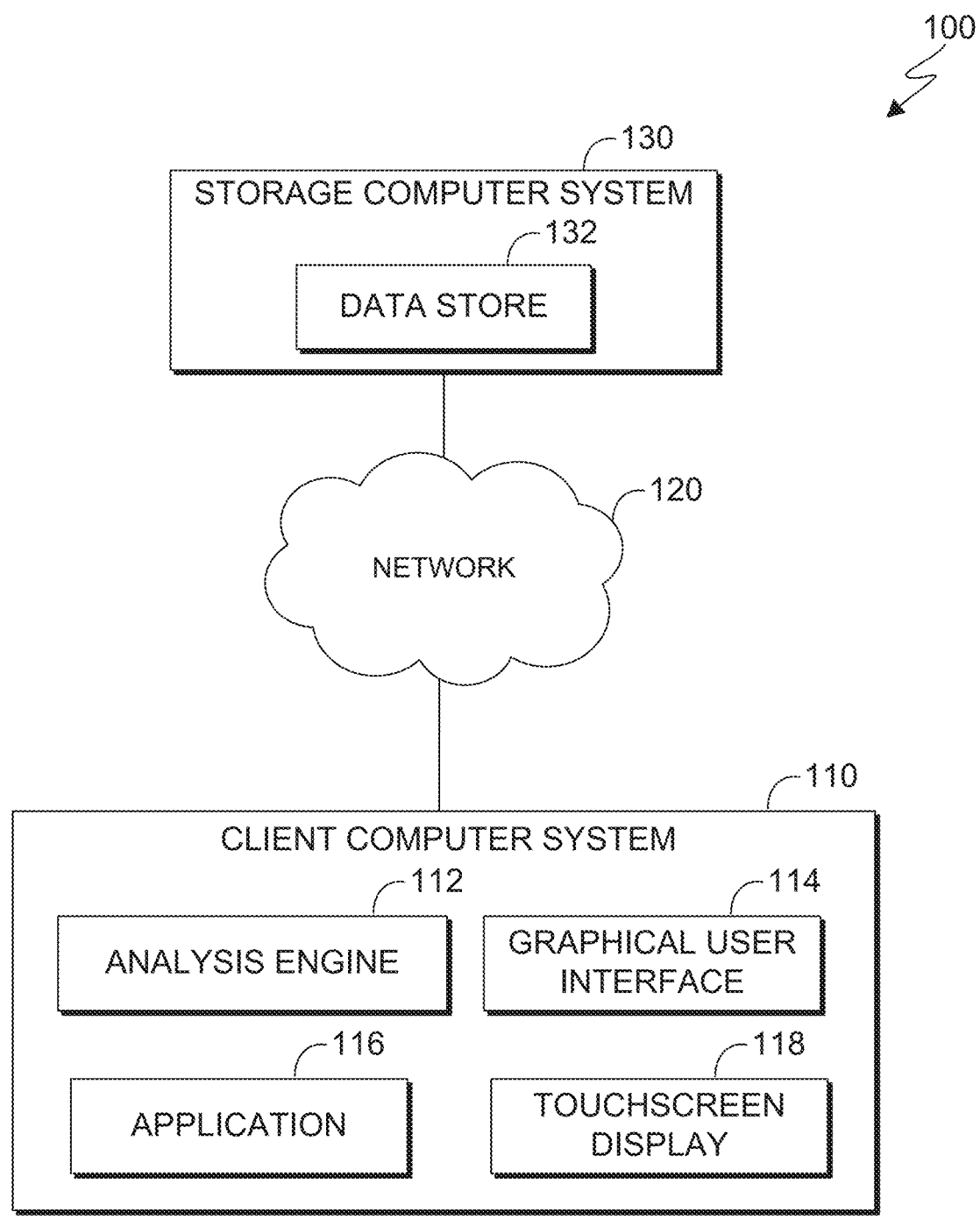
FIG. 1 is a block diagram of a graphical user interface modification environment, in accordance with an embodiment of the present invention.

FIG. 1 is a block diagram of graphical user interface (GUI) modification environment 100, in accordance with an embodiment of the present invention. GUI modification environment 100 includes client computer system 110 and storage computer system 130. Client computer system 110 and storage computer system 130 can be a desktop computers, laptop computers, specialized computer servers, or any other computer systems known in the art, in accordance with an embodiment of the invention. In certain embodiments, client computer system 110 and storage computer system 130 represent computer systems utilizing clustered computers and components to act as a single pool of seamless resources when accessed through network 120. In certain embodiments, client computer system 110 and storage computer system 130 represent virtual machines. In general, client computer system 110 and storage computer system 130 are representative of any electronic devices, or combination of electronic devices, capable of executing machine-readable program instructions in accordance with an embodiment of the invention, as described in greater detail with regard to FIG. 4. In other embodiments, client computer system 110 and storage computer system 130 may be implemented in a cloud computing environment, as described in relation to FIGS. 5 and 6.

Client computer system 110 represents a platform by which one or more users can interact with application 116, via GUI 114 presented on touchscreen display 118. Client computer system 110 includes analysis engine 112, GUI 114, application 116, and touchscreen display 118. In this embodiment, a user of client computer system 110 may use application 116 by interacting with GUI 114 which is presented on touchscreen display 118. The phrase, "touch event" as used herein, refers to a user input (e.g., touch, tapped, swipe, etc.) on touchscreen display 118 performed by a user of client computer system 110 to interact with a portion of GUI 114 and is associated with touch event information. For example, a user may perform a touch event on touchscreen display 118 to interact with a specific graphical element of GUI 114 (e.g., a Home button). Application 116 receives an indication from GUI 114 that user selection of the Home button has occurred, and responds appropriately.

Analysis engine 112 receives touch event information from, for example, GUI 114 via an API, that identifies the specific graphical element of GUI 114 touched, and the shape of the physical area touched on touchscreen display 118. Analysis engine 112 may generate a density map, based on the touch event information, to modify GUI 114. The phrase "density map" as used herein, refers to a representation of GUI 114 that identifies portions of touchscreen display 118 most frequently receiving touch events (e.g., touched, tapped, etc.). Stated differently, a density map is based on the frequency of touch events on touchscreen display 118 as a function of touch event position on touchscreen display 118. A density map may be generated for each selectable graphical element of GUI 114. The density map may combine touch events, such that analysis engine 112 can use the density map to determine a manner in which to modify a boundary of a graphical element of GUI 114, such that the modified graphical element is modified based on the analyzed touch event information. For example, GUI 114 may include four square-shaped graphical elements, such as touch selectable buttons. In this instance, a density map can be generated by analysis engine 112 to graphically represent one or more interactions between a user and the four square-shaped graphical elements. The generated density map may reveal that each of the one or more touch events between the user and the four square-shaped graphical elements takes the form of a circle. Accordingly, analysis engine 112 may modify the boundaries of the four square-shaped graphical elements and the associated areas of touchscreen display 118, such that an area of each of the four square-shaped graphical elements matches the circle area, as presented by the density map. Alternatively, the areas of touchscreen display 118 associated with the four square-shaped graphical elements of GUI 114 may be modified to match the circle areas determined by the density map, while not modifying the visual display of the four square-shaped graphical elements of GUI 114.

GUI 114 represents an interface that includes one or more interactive graphical elements enabling a user of client computer system 110 to use application 116 executed on client computer system 110. For example, the user of client computer system 110 may perform various tasks of application 116 by interacting with GUI 114. In one embodiment, GUI 114 may include a virtual keyboard, which can be arranged similar to a standard QWERTY-based layout, presented on display 118. In another embodiment, different keyboard layouts may be implemented based on, for example, the geographical region in which client computer system 110 is used (e.g., QWERTZ-based layout, AZERTY-based layout, etc.) presented on touchscreen display 118. In general, GUI 114 may include graphical icons, visual indicators, and other graphical elements by which the user of client computer system 110 interacts with application 116 to perform various tasks. It should be understood that GUI 114 can dynamically transform (e.g., modulating size, changing orientation, etc.) based upon various parameters, such as a size and/or resolution of touchscreen display 118, an orientation of touchscreen display 118, viewing angle of a user interacting with touchscreen display 118, etc. Analysis engine 112 may generate a user interface (UI) structure that is a representation of GUI 114 prior to a modification operation, as described in greater detail later in this specification.

Application 116 represents a program used by one or more users of client computer system 110 to perform various tasks, via GUI 114. In one embodiment, more than one application 116 can be executed on client computer system 110. A first of the more than one application 116 may implement a unique GUI 114 configured specifically for the first of the more than one application 116. For example, application 116 may be a video game executed on client computer system 110 that implements GUI 114. In this instance, GUI 114 may include two buttons (e.g., an up-button and a down-button), as further described with regard to FIGS. 4A-4C. In another example, application 116 may be a textual input computer program, such that GUI 114 includes a virtual keyboard, as described above. In general, application 116 may be used for various purposes by a user of client computer system 110, such as, general productivity, information retrieval, entertainment, communication, etc.

Touchscreen display 118 presents information provided by application 116 to the user of client computer system 110. Touchscreen display 118 can be an integrated touch-display of client computer system 110, for example, the touch screen of a smartphone. In one embodiment, touchscreen display 118 is an external touch-display of client computer system 110. Touchscreen display 118 can include sensing components to monitor for touch events. Touch events performed on touchscreen display 118 are associated with touch event information that can be received and analyzed by analysis engine 112. A touch event on touchscreen display 118 can be associated with an action performed by application 116 and can represent an interaction with a portion of GUI 114, such as an interactive graphical element of GUI 114. For example, touchscreen display 118 may implement various technologies to monitor for touch events, such as resistive touch and capacitive touch technologies. A granularity for a density map of touchscreen display 118 is based in part, on the technology used to monitor for touch events. For example, if touchscreen display 118 implements a resistive touch technology, then a granularity for a density map is based on the resolution of the resistive touch technology (e.g., 4096×4096 DPI).

In one embodiment, touch event information may include, for example, a timestamp and/or duration for a touch event (i.e., an instance of tapping, swiping), an application associated with the touch event (i.e., application 116), one or more panels of application 116 (i.e., additional views of application 116), and one or more coordinates or other geometrical shape information that define an area of the touch event.

Storage computer system 130 represents a platform for storing and managing information for each of the one or more users of client computer system 110, their respective interactions with GUI 114, and other GUI and touchscreen interaction information. Storage computer system 130 includes data store 132. As previously discussed, more than one application 116 may be executed on client computer system 110. In this instance, more than one GUI 114 may correspond to each of the more than one application 116. Accordingly, data store 132 stores touch event information for each GUI 114 for the each of the more than one application 116. In one embodiment, storage computer system 130 can transmit information from data store 132 to client computer system 110 and components therein via network 120. For example, application 116 may request client computer system 110 for GUI 114 to be presented to a user of client computer system 110. In this instance, information related to GUI 114 may be exchanged between storage computer system 130 and client computer system 110. The information may include modified dimensions or boundaries of one or more graphical elements of GUI 114, information to identify a user of GUI 114, and sensing information. In another embodiment, data store 132 is a storage component implemented by client computer system 110 (not depicted). In yet another embodiment, data store 132 may include a UI structure (i.e., a previously modified GUI 114), as described in greater detail later in this specification.

It should be understood that, for illustrative purposes, FIG. 1 does not show other computer systems and elements which may be present when implementing embodiments of the present invention. For example, while FIG. 1 shows a client computer system 110 and a single storage computer system 130 and can also include additional client computer systems 110 and storage computer systems 130 to support automated modification of GUI 114 for multiple computer devices.

Figure 2:
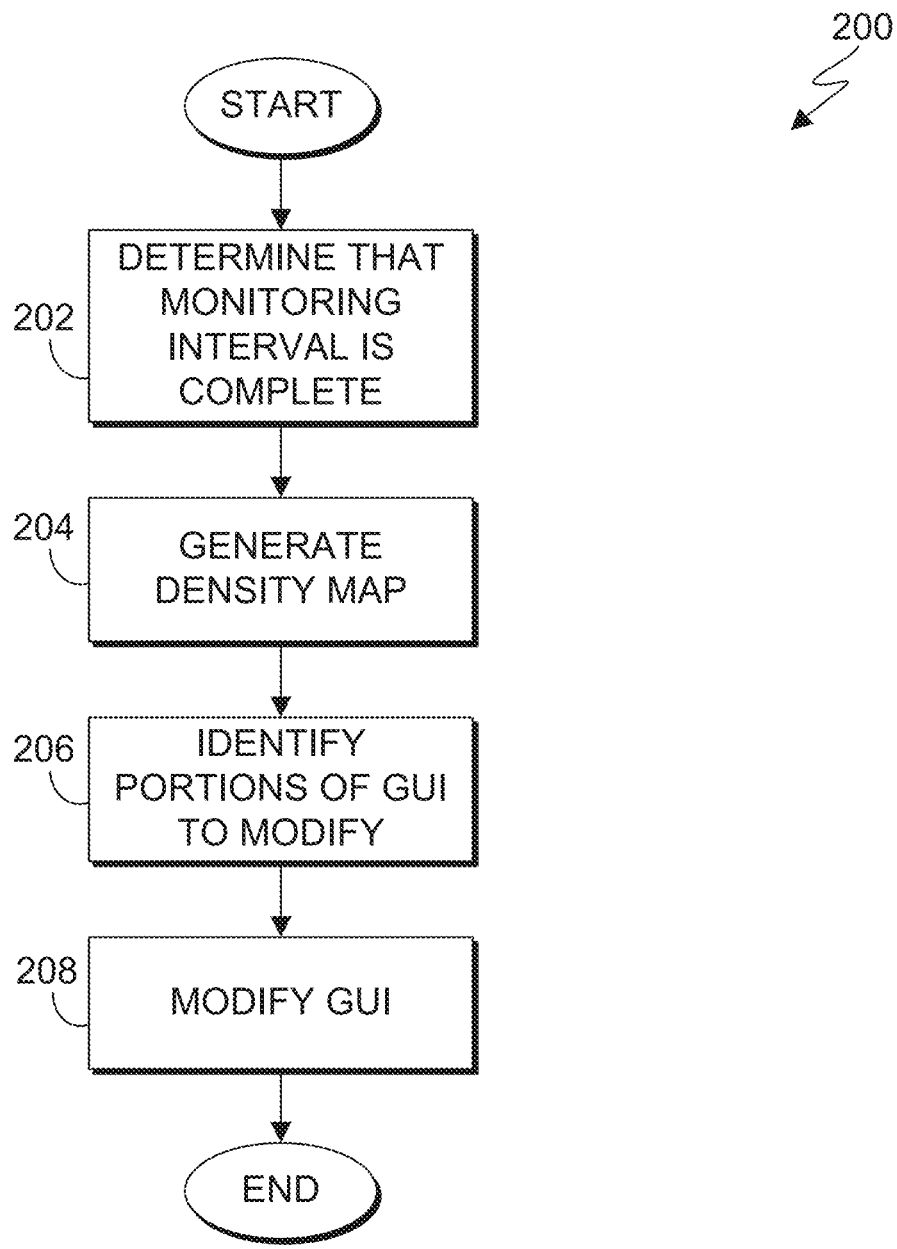
FIG. 2 is a flowchart illustrating operational steps for modifying a graphical user interface, in accordance with an embodiment of the present invention.

FIG. 2 is a flowchart 200 illustrating operational steps of analysis engine 112 for modifying GUI 114, in accordance with an embodiment of the present invention.

In step 202, analysis engine 112 determines that a monitoring interval is complete. A monitoring interval is a time duration for analysis engine 112 to receive touch event information. In one embodiment, analysis engine 112 may indicate that a monitoring interval to receive touch event information is complete if a number of touch events on touchscreen display 118 performed by a user of client computer system 110 exceeds a predefined threshold. In another embodiment, analysis engine 112 may indicate that the monitoring interval is complete if a time-out occurs. For example, a user of client computer system 110 may be idle for a duration of time when interacting with GUI 114. In this instance, if the duration of idle time triggers a time-out, then analysis engine 112 may indicate that the monitoring interval is complete. It should be understood that, a time-out may not be triggered if a number of recorded touch events are not sufficient to generate a density map based on the associated touch event information.

In step 204, analysis engine 112 generates a density map using touch event information received during the monitoring interval. In one embodiment, analysis engine 112 aggregates touch event information received by sensing components of touchscreen display 118, as previously discussed. An exemplary method by which analysis engine 112 generates a density map is described below in reference to FIGS. 3A, 3B, and 3C.

In step 206, analysis engine 112 identifies one or more portions of GUI 114 for modification. In one embodiment, analysis engine compares a UI structure with the density map. The phrase, "UI structure" as used herein, refers to a representation of a previous or an original layout of GUI 114. For example, a UI structure may be a representation of GUI 114 prior to any modifications performed by analysis engine 112. In another example, a UI structure may be a representation of a most recently modified version of GUI 114. Accordingly, analysis engine 112 may compare the density map with a UI structure to identify portions of the touchscreen display do not align with a threshold alignment value.

In step 208, analysis engine 112 modifies the portions of GUI 114 it identified for modification. Modifications to GUI 114 may include modifying a dimension of one or more graphical elements of GUI 114, such as increasing a size of a graphical element that is most frequently interacted with, by a user of client computer system 110. Another modification to GUI 114 may involve decreasing a size of a graphical element that is not frequently interacted with, by a user of client computer system 110. Other modifications to GUI 114 may involve transposing one or more portions of a generated density map. For example, a user of client computer system 110 may frequently tap a square graphical element, but a density map generated from touch event information may indicate that a circular portion encompassing an area of the square graphical element is frequently interacted with by the user of client computer system. In this instance, the square graphical element may be modified into the circular area, as indicated by the density map. Accordingly, modifications to GUI 114 may improve accessibility for the user of client computer system 110 to one or more graphical elements of GUI 114, and may improve ease of use for the modified GUI 114 used by the user of client computer system 110 interacting with application 116. In one embodiment, analysis engine 112 can present the modified GUI 114 on touchscreen display 118 of client computer system 110. In another embodiment, a new monitoring interval may restart. In this instance, the received touch event information for the new monitoring interval may result in an additional modifications of GUI 114. In yet another embodiment, a notification may be prompted to a user of client computer system 110, indicating that GUI 114 has been modified for the user of client computer system 110. In this instance, the user of client computer system 110 may accept, reject, or modify the modified GUI 114. In certain embodiments, modification of a portion of GUI 114 may include changing the dimensions of a graphical element of GUI 114, and modifying the corresponding touch screen area to different dimensions and/or a different screen position relative to the graphical element.

Figure 3A:
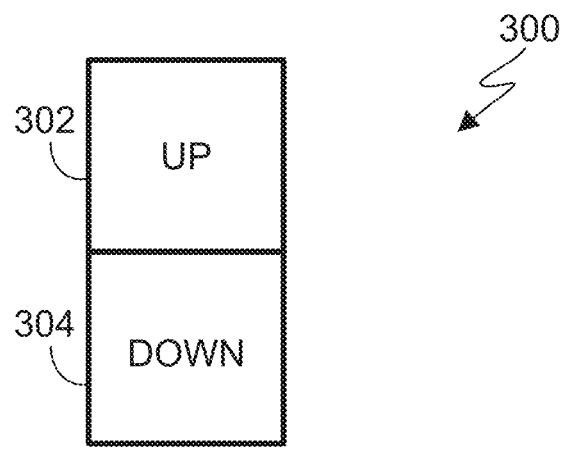
FIGS. 3A-3C are block diagrams of graphical elements of a graphical user interface, in accordance with an embodiment of the present invention.
Figure 3B:
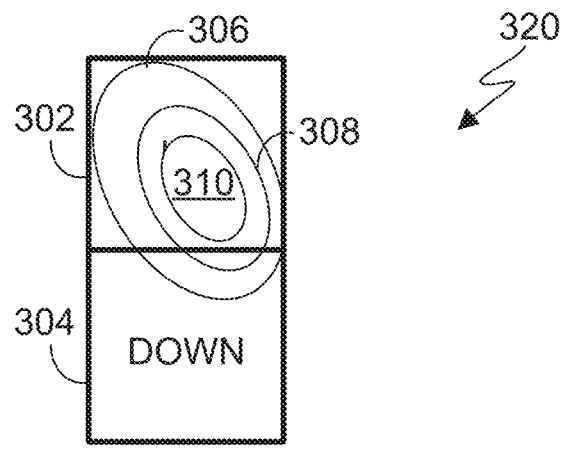
Figure 3C:
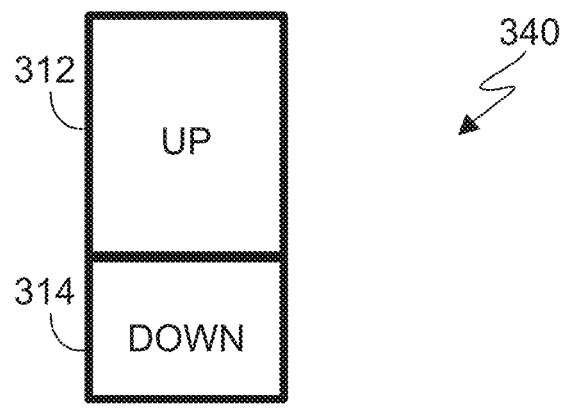

FIGS. 3A-3C are diagrams representing graphical elements of GUI 114. In this embodiment, FIGS. 3A-3C present two buttons. For example, FIG. 3A illustrates up-button 302 and down-button 304. In one embodiment, a user of client computer system 110 may perform a touch event on touchscreen display 118 to interact with buttons 302 and 304 of GUI 114. Each area of up-button 302 and down-button 304 displayed on touchscreen display 118 includes a plurality of dots, wherein each dot is an area configured to receive a touch event performed on touchscreen display 118. It should be understood that, FIGS. 3A-3C are provided for illustrative purposes, and that FIGS. 3A-3C may include a smaller or larger number of graphical elements. A shape of each graphical element (e.g., up-button 302, down-button 304, etc.) can be a regular and/or an irregular shape.

FIG. 3A is a block diagram 300 representing graphical elements of GUI 114 for application 116. For example, block diagram 300 may represent two graphical elements of GUI 114 used to interact with application 116 of client computer system 110 (e.g., a video game). In this instance, up-button 302 may represent a virtual up-key of GUI 114, and down-button 304 may represent a virtual down-key of GUI 114. A user of client computer system 110 may perform a touch event on touchscreen display 118 to interact with up-button 302, such that application 116 performs a jump command in the video game. Similarly, a user of client computer system 110 may perform a touch event on touchscreen display 118 to interact with down-button 304, such that application 116 performs a duck command for the video game. In another example, application 116 may be an image viewing application, wherein a user of client computer system 110 may interact with up-button 302 to scroll upwards in application 116 and the user of client computer system 110 may interact with down-button 304 to scroll downwards in application 116.

FIG. 3B is a block diagram 320 representing a density map for the two graphical elements of GUI 114. As previously discussed, a density map is generated from touch event information received during a monitoring interval. FIG. 3B identifies one or more graphical elements of GUI 114 presented in FIG. 3A most frequently interacted with, by a user of client computer system 110 when using application 116. In this embodiment, section 306, section 308, and section 310 represent three portions of GUI 114, wherein each of the three portions vary in frequency with respect to a number of instances of touch events received during a monitoring interval. The density map shows section 306 as the largest of sections 306, 308, and 310, which may indicate that the user of client computer system 110 interacted with an area of section 306 least frequently compared to sections 308 and 310. Section 308 is illustrated as the second largest of sections 306, 308, and 310, which may indicate that the user of client computer system 110 interacted with section 308 second most frequently compared to sections 306 and 310. Section 310 is illustrated as the smallest of sections 306, 308, and 310, which may indicate that the user of client computer system 110 interacted with section 310 most frequently compared to sections 306 and 308. In this embodiment, up-button 302 and down-button 304 are disposed in GUI 114 directly next to each other in FIG. 3A. Accordingly, a user of client computer system 110 can interact with buttons 302 and 304, and touch event information associated with the interactions contribute to touch event information used to generate FIG. 3B. In this instance, additional information may be used to determine a contribution amount from a particular graphical element of GUI 114. Stated differently, analysis engine 112 may use additional information to ensure that touch event information that is used to modify graphical elements of GUI 114 are used appropriately. This information is used by analysis engine 112, such that boundaries of neighboring graphical elements, such as up-button 302 and down-button 304, are only being modified in accordance with touch event information particular to the graphical element being modified.

FIG. 3C is a block diagram 340 representing graphical elements of a modified GUI 114. In one embodiment, analysis engine 112 may compare graphical elements of a UI structure, such as a representation of FIG. 3A, with a density map, such as FIG. 3B, to generate graphical elements that are a part of a modified GUI 114. In this embodiment, analysis engine 112 identified section 306, section 308, and section 310 in the density map as portions of GUI 114 most frequently interacted with when a user of client computer system 110 attempts to interact with up-button 302 of GUI 114. In this instance, analysis engine 112 determines that up-button 302 of FIG. 3A may require a larger area in accordance with the density map presented in FIG. 3B. Accordingly, up-button 302 from FIG. 3A is modified by increasing an associated area, such that the graphical element represented by up-button 302 is now up-button 312 and down-button 304 from FIG. 3A is now down-button 314. In another embodiment, an area configured to receive touch events for a particular graphical element of GUI 114 can be modified. For example, an area of the graphical element, such as an area of up-button 302, may not be modified into up-button 312. Instead, an area that contains sections 306, 308, and 310 may be configured to perform an action associated with up-button 302. In this example, a modified GUI 114 may involve receiving a touch event performed on an area of section 306 and modifying an area configured to receive touch events, such that the touch event on an area of section 306 is associated with an interaction on up-button 302.

Figure 4:
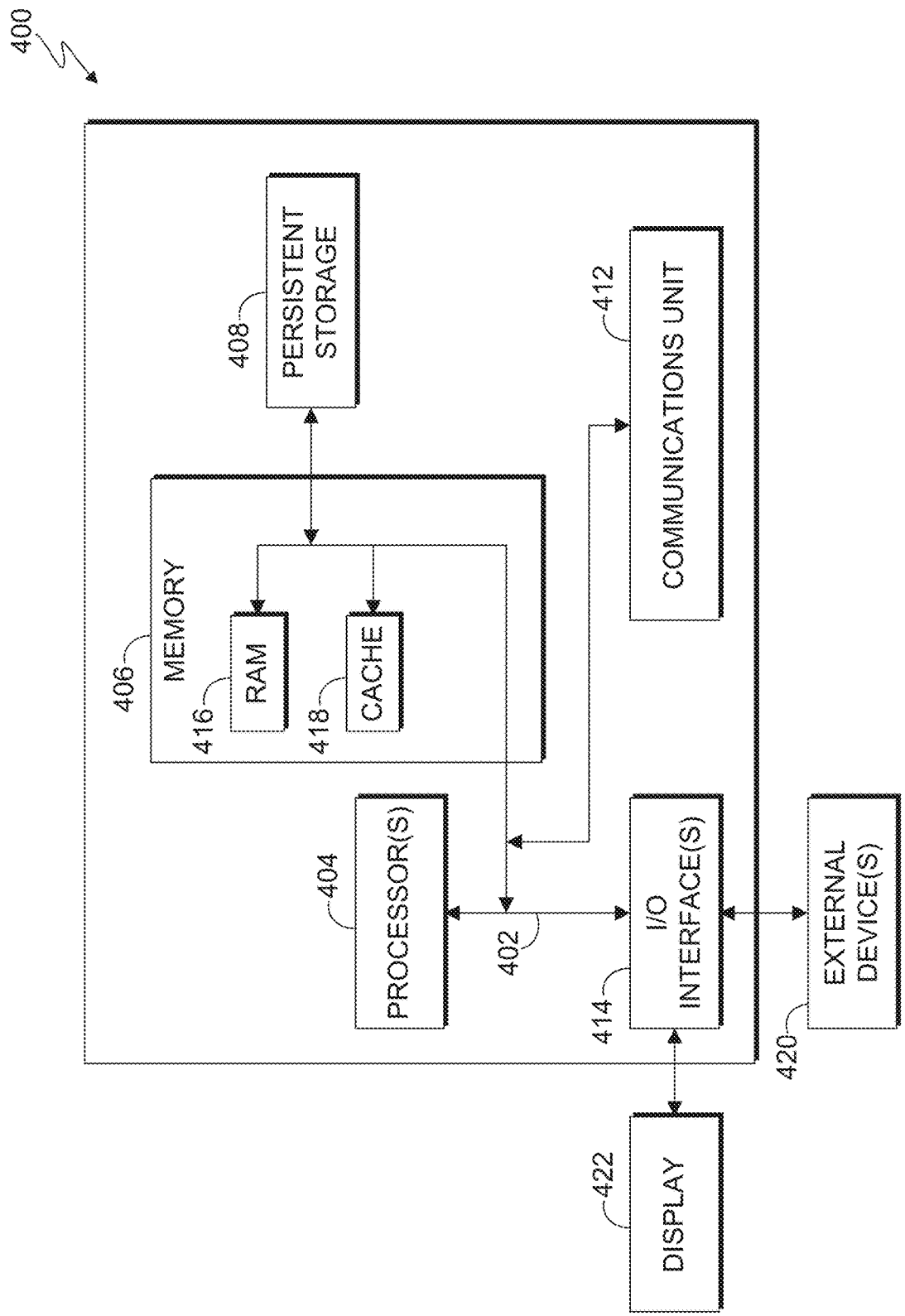
FIG. 4 is a block diagram of internal and external components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 120). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to client computer system 110 through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420 such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

Figure 5:
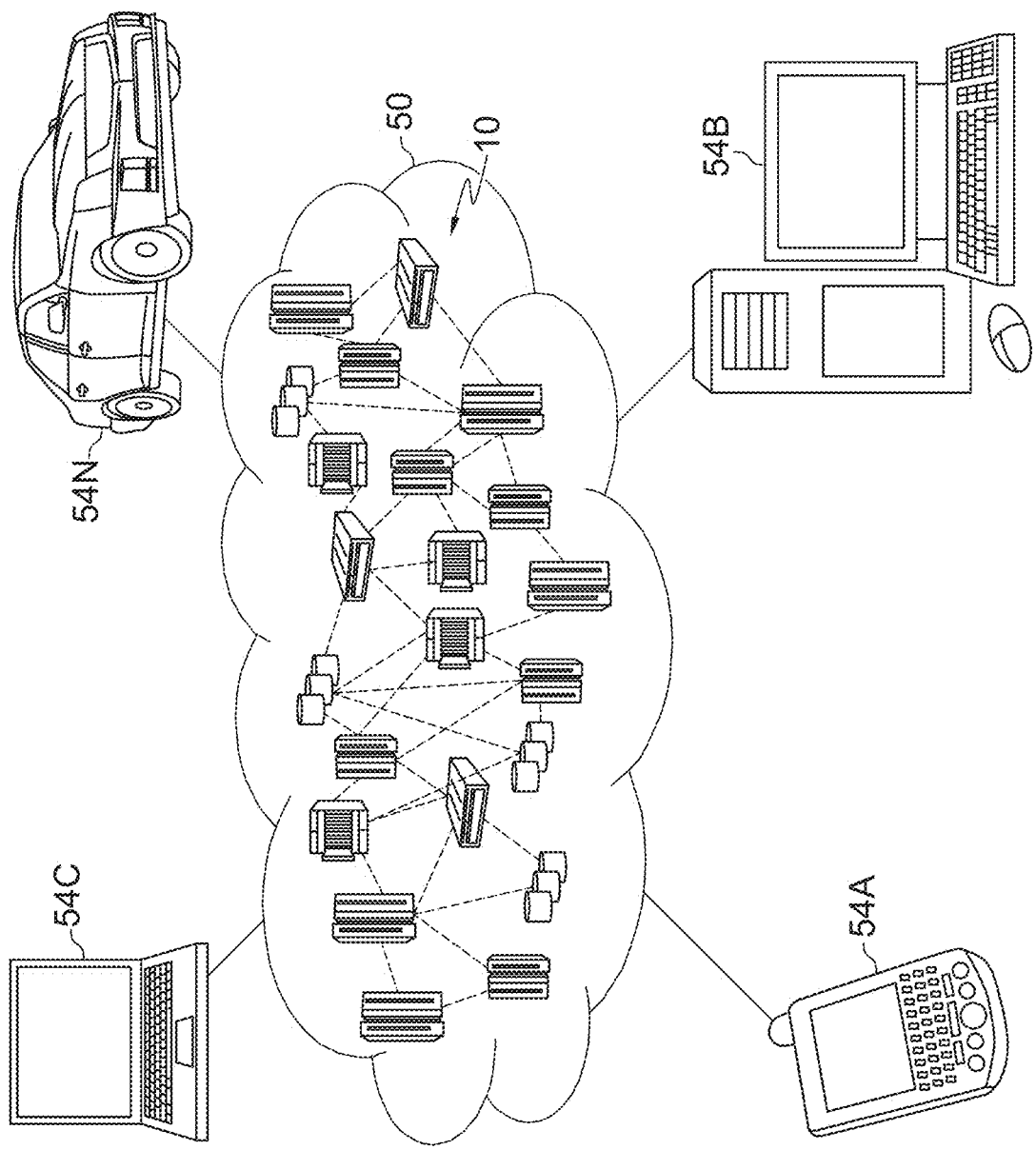
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that cloud computing nodes 10 and cloud computing environment 50 can communicate with any type of computerized device over any type of network and/or network addressable connection (e.g., using a web browser).

Figure 6:
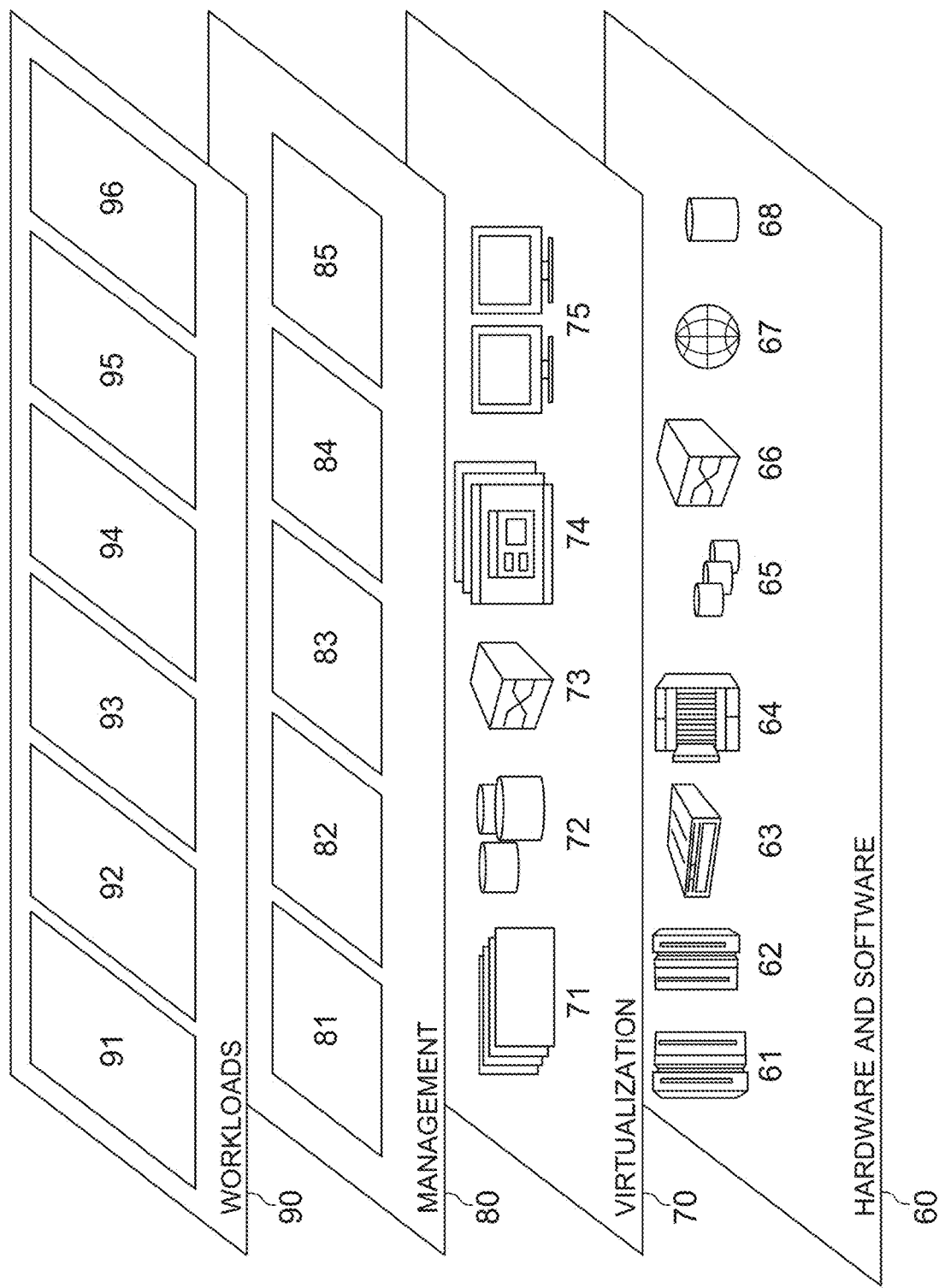
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI modification environment 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in FIGS. 1-6 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in FIGS. 1-6. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in FIGS. 1-6 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in FIGS. 1-6. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

What is claimed is:

1. A method for automatically modifying a graphical user interface (GUI), the method comprising:

receiving, by one or more computer processors, information that describes one or more touch events performed on a touchscreen display to interact with the GUI of a software application;

generating, by one or more computer processors, a touch event density map based on a frequency of touch events on the touchscreen display as a function of touch event position on the touchscreen display for each of the one or more graphical elements of the GUI, wherein each of the one or more graphical elements of the GUI having a shape of a physical area that identifies an area on the touchscreen display associated with the each of the one or more graphical elements and a visually displayed shape having a four square shaped graphical element that is displayed on the touchscreen display;

identifying, by one or more computer processors, one or more portions of the touchscreen display that received a highest density of touch events based on analyzing the one or more portions of the touch event density map to identify one or more portions of the touchscreen display that receives the highest density of touch events;

identifying, by one or more computer processors, one or more graphical elements of the GUI associated with the one or more identified portions of the touchscreen display; and responsive to determining that the one or more graphical elements of the GUI associated with the one or more identified portions of the touchscreen display do not align with a threshold alignment value modifying, by one or more computer processors, the shape of the physical area of the one or more graphical elements of the GUI associated with the one or more identified portions of the touchscreen display, wherein the visually displayed shape of the one or more graphical elements of the GUI are not modified, a size of each of the one or more graphical elements of the GUI based on a frequency of a user interaction with each of the one or more graphical elements of the GUI, and a position of the physical area of the one or more graphical elements relative to the one or more graphical elements of the touchscreen display area, wherein the visually displayed shape of the one or more graphical elements of the GUI are not modified.

2. The method of claim 1, wherein generating a touch event density map based on the frequency of touch events on the touchscreen display as a function of touch event position on the touchscreen display comprises:

receiving, by one or more computer processors, a touch event on the touchscreen display; and responsive to determining that a monitoring interval to record a touch event on the touchscreen display is complete, aggregating, by one or more computer processors, each touch event of the monitoring interval to generate the touch event density map based on the frequency of touch events on the touchscreen display as a function of touch event position on the touchscreen display.

3. The method of claim 2, wherein a monitoring interval to record touch event on the touchscreen display is complete based on at least one of: a number of touch events received on the touchscreen display exceeds a predefined threshold, and a time-out occurring.

4. The method of claim 1, wherein the shape of the physical area having a circular area based on the touch event density map, wherein the circular area encompasses the area of the GUI associated with the one or more identified portions of the touchscreen display.

5. The method of claim 1, wherein a granularity for a touch event density map is dependent on a number of areas implemented by the touchscreen display that are configured to receive information that describes one or more touch events.

6. The method of claim 1, wherein responsive to determining that the one or more graphical elements of the GUI associated with the one or more identified portions of the touchscreen display do not align with the threshold alignment value comprises:

analyzing, by one or more computer processors, the touch event density map to determine that the one or more graphical elements of the GUI associated with the one or more portions of the touchscreen display that do not align with the threshold alignment value.

7. The method of claim 6, further comprising:

comparing, by one or more computer processors, the GUI with the one or more identified portions of the touchscreen display to identify the one or more graphical elements of the GUI associated with the one or more identified portions of the touchscreen display that do not align with the threshold alignment value.

8. A computer program product for automatically modifying a graphical user interface (GUI), the computer program product comprising:

one or more computer readable storage media and program instructions stored on the one or more computer readable storage media, the program instructions comprising:

program instructions to receive information that describes one or more touch events performed on a touchscreen display to interact with the GUI of a software application;

program instructions to generate a touch event density map based on a frequency of touch events on the touchscreen display as a function of touch event position on the touchscreen display for each of the one or more graphical elements of the GUI, wherein each of the one or more graphical elements of the GUI having a shape of a physical area that identifies an area on the touchscreen display associated with the each of the one or more graphical elements and a visually displayed shape having a four square shaped graphical element that is displayed on the touchscreen display;

program instructions to identify one or more portions of the touchscreen display that received a highest density of touch events based on analyzing the one or more portions of the touch event density map to identify one or more portions of the touchscreen display that receives the highest density of touch events;

program instructions to identify one or more graphical elements of the GUI associated with the one or more identified portions of the touchscreen display; and program instructions to, responsive to determining that the one or more graphical elements of the GUI associated with the one or more identified portions of the touchscreen display do not align with a threshold alignment value, modify the shape of the physical area of the one or more graphical elements of the GUI associated with the one or more identified portions of the touchscreen display, wherein the visually displayed shape of the one or more graphical elements of the GUI are not modified, a size of each of the one or more graphical elements of the GUI based on a frequency of a user interaction with each of the one or more graphical elements of the GUI, and a position of the physical area of the one or more graphical elements relative to the one or more graphical elements of the touchscreen display area, wherein the visually displayed shape of the one or more graphical elements of the GUI are not modified.

9. The computer program product of claim 8, wherein program instructions to generate a touch event density map based on the frequency of touch events on the touchscreen display as a function of touch event position on the touchscreen display comprise:

program instructions to receive a touch event on the touchscreen display; and program instructions to, responsive to determining that a monitoring interval to record a touch event on the touchscreen display is complete, aggregate each touch event of the monitoring interval to generate the touch event density map based on the frequency of touch events on the touchscreen display as a function of touch event position on the touchscreen display.

10. The computer program product of claim 9, wherein a monitoring interval to record touch event on the touchscreen display is complete based on at least one of: a number of touch events received on the touchscreen display exceeds a predefined threshold, and a time-out occurring.

11. The computer program product of claim 8, wherein the shape of the physical area having a circular area based on the touch event density map, wherein the circular area encompasses the area of the GUI associated with the one or more identified portions of the touchscreen display.

12. The computer program product of claim 8, wherein a granularity for a touch event density map is dependent on a number of areas implemented by the touchscreen display that are configured to receive information that describes one or more touch events.

13. The computer program product of claim 8, wherein program instructions to, responsive to determining that the one or more graphical elements of the GUI associated with the one or more identified portions of the touchscreen display do not align with a threshold alignment value comprise:

program instructions to analyze a touch event density map to determine that the one or more graphical elements of the GUI associated with the one or more portions of the touchscreen display that do not align with the threshold alignment value.

14. The computer program product of claim 13, wherein the program instructions stored on the one or more computer readable storage media further comprise:

comparing, by one or more computer processors, the GUI with the one or more identified portions of the touchscreen display to identify the one or more graphical elements of the GUI associated with the one or more identified portions of the touchscreen display that do not align with the threshold alignment value.

15. A computer system for automatically modifying a graphical user interface (GUI), the computer system comprising:

one or more computer processors;

one or more computer readable storage media;

program instructions stored on the one or more computer readable storage media for execution by at least one of the one or more processors, the program instructions comprising:

program instructions to receive information that describes one or more touch events performed on a touchscreen display to interact with the GUI of a software application;

program instructions to generate a touch event density map based on a frequency of touch events on the touchscreen display as a function of touch event position on the touchscreen display for each of the one or more graphical elements of the GUI, wherein each of the one or more graphical elements of the GUI having a shape of a physical area that identifies an area on the touchscreen display associated with the each of the one or more graphical elements and a visually displayed shape having a four square shaped graphical element that is displayed on the touchscreen display;

program instructions to identify one or more portions of the touchscreen display that received a highest density of touch events based on analyzing the one or more portions of the touch event density map to identify one or more portions of the touchscreen display that receives the highest density of touch events;

program instructions to identify one or more graphical elements of the GUI associated with the one or more identified portions of the touchscreen display; and program instructions to, responsive to determining that the one or more graphical elements of the GUI associated with the one or more identified portions of the touchscreen display do not align with a threshold alignment value, modify the shape of the physical area of the one or more graphical elements of the GUI associated with the one or more identified portions of the touchscreen display, wherein the visually displayed shape of the one or more graphical elements of the GUI are not modified, a size of each of the one or more graphical elements of the GUI based on a frequency of a user interaction with each of the one or more graphical elements of the GUI, and a position of the physical area of the one or more graphical elements relative to the one or more graphical elements of the touchscreen display area, wherein the visually displayed shape of the one or more graphical elements of the GUI are not modified.

16. The computer system of claim 15, wherein program instructions to generate a touch event density map based on the frequency of touch events on the touchscreen display as a function of touch event position on the touchscreen display comprise:
  program instructions to receive a touch event on the touchscreen display; and
  program instructions to, responsive to determining that a monitoring interval to record a touch event on the touchscreen display is complete, aggregate each touch event of the monitoring interval to generate the touch event density map based on the frequency of touch events on the touchscreen display as a function of touch event position on the touchscreen display.

17. The computer system of claim 16, wherein a monitoring interval to record touch event on the touchscreen display is complete based on at least one of: a number of touch events received on the touchscreen display exceeds a predefined threshold, and a time-out occurring.

18. The computer system of claim 15, wherein the shape of the physical area having a circular area based on the touch event density map, wherein the circular area encompasses the area of the GUI associated with the one or more identified portions of the touchscreen display.

19. The computer system of claim 15, wherein a granularity for a touch event density map is dependent on a number of areas implemented by the touchscreen display that are configured to receive information that describes one or more touch events.

20. The computer system of claim 15, wherein program instructions to, responsive to determining that the one or more graphical elements of the GUI associated with the one or more identified portions of the touchscreen display do not align with a threshold alignment value comprise:
  program instructions to analyze a touch event density map to determine that the one or more graphical elements of the GUI associated with the one or more portions of the touchscreen display that do not align with the threshold alignment value.

\* \* \* \* \*